US011956604B2

(12) United States Patent
Tachi et al.

(10) Patent No.: US 11,956,604 B2
(45) Date of Patent: Apr. 9, 2024

(54) IN-VEHICLE COMMUNICATION SUPPORT SYSTEM

(71) Applicant: ALPS ALPINE CO., LTD., Tokyo (JP)

(72) Inventors: Ryosuke Tachi, Fukushima (JP); Hiroyuki Taguchi, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 17/858,248

(22) Filed: Jul. 6, 2022

(65) Prior Publication Data

US 2023/0018804 A1 Jan. 19, 2023

(30) Foreign Application Priority Data

Jul. 14, 2021 (JP) ................................ 2021-116442

(51) Int. Cl.
*H04R 3/00* (2006.01)
*H04R 1/02* (2006.01)
(Continued)

(52) U.S. Cl.
CPC ............ *H04R 3/002* (2013.01); *H04R 1/025* (2013.01); *H04R 1/406* (2013.01); *H04R 3/04* (2013.01);
(Continued)

(58) Field of Classification Search
CPC ........ H04R 3/002; H04R 1/025; H04R 1/406; H04R 3/04; H04R 2201/401; H04R 2410/01; H04R 2499/13
See application file for complete search history.

(56) References Cited

U.S. PATENT DOCUMENTS 6,618,485 B1 9/2003 Matsuo
6,980,663 B1 * 12/2005 Linhard .................. H04R 3/02 381/86
(Continued)

FOREIGN PATENT DOCUMENTS

JP 11-234790 8/1999
JP 2001-142469 5/2001
(Continued)

OTHER PUBLICATIONS

Extended European Search Report dated Nov. 23, 2022 in corresponding European Patent Application No. 22183438.5.

*Primary Examiner* — Jason R Kurr
(74) *Attorney, Agent, or Firm* — Crowell & Moring LLP

(57) ABSTRACT

A right seat processing unit includes, assuming that a voice of a user in a right front seat is a right front seat voice, a filter HR that converts the right front seat voice being output from a left front seat microphone disposed on a headrest of a left front seat into the right front seat voice collected by a right seat virtual microphone that is a virtual microphone located on a left side of a headrest of the right front seat, a delay unit $Z^{-TR}$ that delays and outputs an output from a right front seat microphone located on a right side of the headrest of the right front seat, a filter WRA that extracts the right front seat voice being output from the filter HR, a filter WRB that extracts the right front seat voice being output from the delay unit $Z^{-TR}$, and a right adder that adds outputs of the filter WRA and the filter WRB and outputs an added output as a right front seat speech voice signal.

8 Claims, 5 Drawing Sheets

(51) Int. Cl.
*H04R 1/40* (2006.01)
*H04R 3/04* (2006.01)

(52) U.S. Cl.
CPC .... *H04R 2201/401* (2013.01); *H04R 2410/01* (2013.01); *H04R 2499/13* (2013.01)

(56) References Cited

U.S. PATENT DOCUMENTS

| | | | | |
|---|---|---|---|---|
| 9,947,334 | B2 * | 4/2018 | Gupta | G10L 21/0208 |
| 11,546,689 | B2 * | 1/2023 | Rangarajan | B60R 16/0373 |
| 2007/0280486 | A1 * | 12/2007 | Buck | H04R 27/00 381/92 |
| 2011/0051951 | A1 | 3/2011 | Burnett | |
| 2016/0119712 | A1 * | 4/2016 | Tzirkel-Hancock | H04R 1/406 381/86 |
| 2017/0011753 | A1 * | 1/2017 | Herbig | G10L 21/0232 |
| 2017/0193976 | A1 | 7/2017 | Mohammad et al. | |
| 2017/0251304 | A1 | 8/2017 | Herbig et al. | |
| 2020/0020315 | A1 | 1/2020 | Tachi et al. | |
| 2020/0245066 | A1 * | 7/2020 | Miyamoto | H04R 3/14 |
| 2023/0026003 | A1 * | 1/2023 | Miyamoto | G10L 21/0208 |

FOREIGN PATENT DOCUMENTS

| | | |
|---|---|---|
| JP | 2002-51392 | 2/2002 |
| WO | 02/32356 | 4/2002 |

* cited by examiner

FIG. 2A1
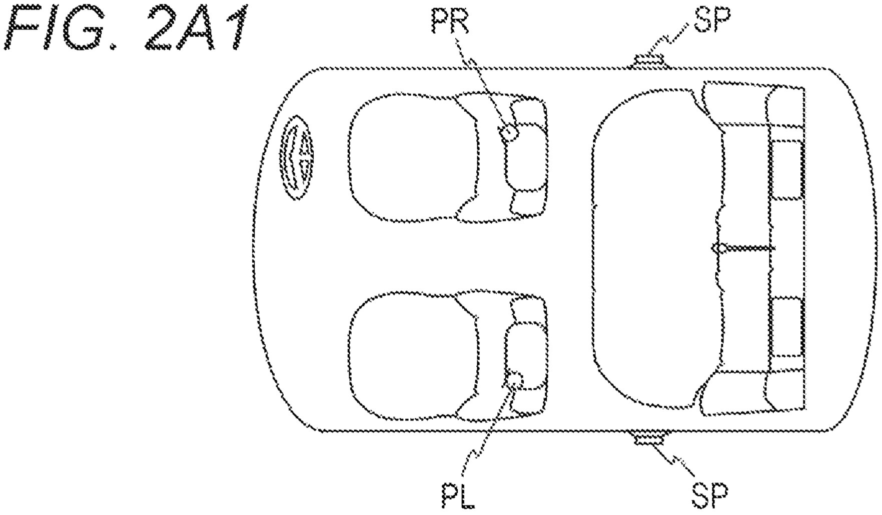
FIG. 2A2
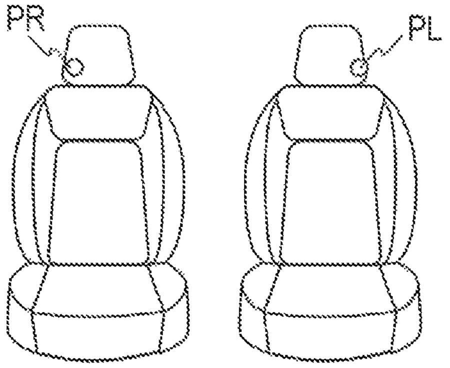
FIG. 2B
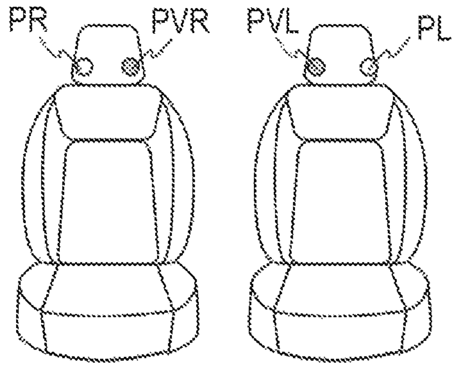

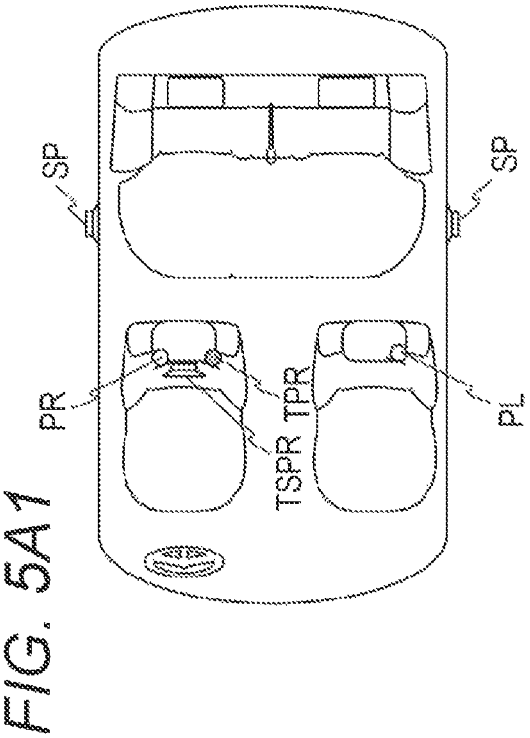
FIG. 5A1
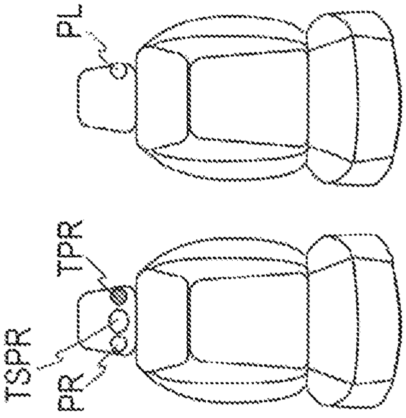
FIG. 5A2
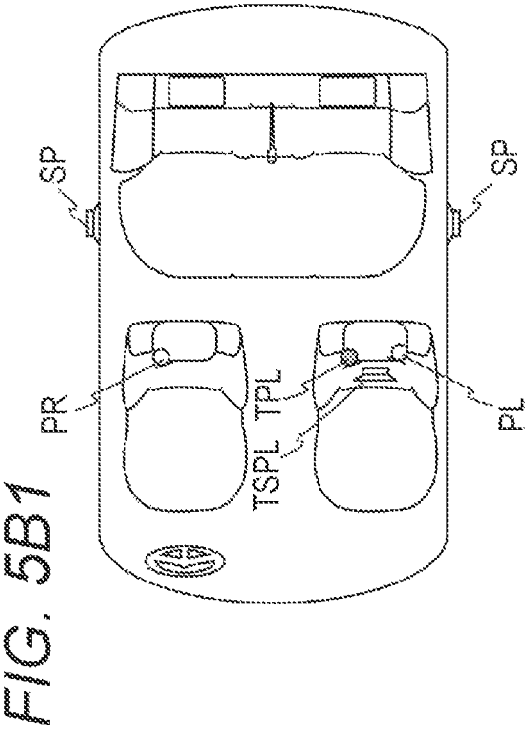
FIG. 5B1
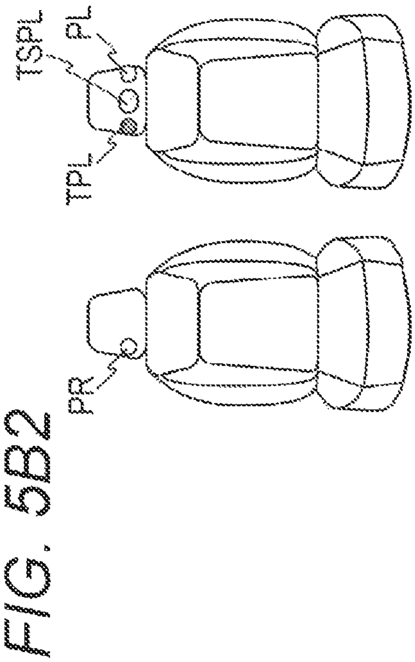
FIG. 5B2

IN-VEHICLE COMMUNICATION SUPPORT SYSTEM

RELATED APPLICATION

The present application claims priority to Japanese Patent Application Number 2021-116442, filed Jul. 14, 2021 the entirety of which is hereby incorporated by reference.

BACKGROUND

1. Field of the Disclosure

The present disclosure relates to a technology for supporting communication by speech in a vehicle.

2. Description of the Related Art

As a technique for supporting communication by speech in a vehicle, there is known a technique of collecting a speech voice of a user seated in a first seat of an automobile with a microphone, synthesizing the speech voice having a gain adjusted so that a user in a second seat can clearly hear the speech voice with an output sound such as music output from an audio device, and outputting a synthesized sound from a speaker (for example, JP 2002-51392 A).

Further, there is also known a technique of a microphone array that causes a plurality of microphones to function as a high-directivity microphone by synthesizing outputs of the plurality of microphones by adjusting delay times so that phases of a target sound match, to improve an SN ratio of the target sound (for example, JP 11-234790 A).

Further, there is also known a technique for converting a target sound collected by a microphone disposed at a first position into the target sound to be collected when a microphone is disposed at a second position, using a filter (for example, JP 2001-142469 A).

In this technique, the microphone is actually disposed at the second position in advance, and a transfer function that minimizes a difference between an output of the microphone disposed at the first position and an output of the microphone disposed at the second position is obtained using an adaptive filter and set as the transfer function of the filter.

SUMMARY

According to the above-described technique for supporting communication by speech in a vehicle, when the output sound of the audio device output from the speaker is collected and is mixed with the output of the microphone, the SN ratio of the speech voice of the user in the first seat decreases, and it becomes difficult for the user in the second seat to hear the speech voice. Further, since a delayed sound of the output sound of the audio device that has flown into the microphone is output from the speaker, reverberation increases and the entire interior of the vehicle has saturated audibility.

Such a problem can be alleviated by collecting the speech voice of the user in the first seat with a good SN ratio using a high-directivity microphone.

However, since the high-directivity microphone generally has a relatively large and unique shape, problems arise in terms of design limitation and incorporation into an automobile. Meanwhile, implementing the high-directivity microphone using the microphone array is not efficient because the cost increases due to an increase in the number of microphones and a processing load increases.

Therefore, an object of the present disclosure is to improve the SN ratio of a speech voice to be output from a speaker with a relatively efficient configuration in an in-vehicle communication support system that collects a speech voice of a user with a microphone and outputs the speech voice from the speaker to other users.

To address the above problem, the present disclosure provides an in-vehicle communication support system mounted on an automobile having a first seat and a second seat that are seats arranged right and left and a third seat that is a seat arranged, in a front-rear direction, with the first seat and the second seat, with a first microphone that is a microphone disposed near the first seat, a second microphone that is a microphone disposed near the second seat, a speaker configured to output sound toward the third seat, and a signal processing unit configured to generate a speech voice of a user in the first seat and a speech voice of a user in the second seat to be output to the speaker using an output of the first microphone and an output of the second microphone. Here, the signal processing unit includes, assuming that a voice having a sound source position at a speech position of a user in the first seat is a first seat voice, a first filter configured to convert the first seat voice collected by the second microphone into the first seat voice collected by a first seat virtual microphone that is a virtual microphone located at a position closer to the first seat than the second microphone, and outputs the first seat voice, and generates an output of a virtual microphone array including the first microphone and the first seat virtual microphone and having higher directivity to the speech position of the user in the first seat as compared with the first microphone, as the speech voice of the user in the first seat to be output to the speaker by using the output of the first microphone and an output of the first filter.

Furthermore, to address the above problem, the present disclosure includes, in an in-vehicle communication support system mounted on an automobile having a first seat and a second seat that are seats arranged right and left and a third seat that is a seat arranged, in a front-rear direction, with the first seat and the second seat, a first microphone that is a microphone disposed near the first seat, a second microphone that is a microphone disposed near the second seat, a speaker configured to output sound toward the third seat, and a signal processing unit configured to generate a speech voice of a user in the first seat and a speech voice of a user in the second seat to be output to the speaker by using an output of the first microphone and an output of the second microphone.

Here, the signal processing unit includes, assuming that a voice having a sound source position at a speech position of a user in the first seat is a first seat voice, a first filter configured to convert the first seat voice collected by the second microphone into the first seat voice collected by a first seat virtual microphone that is a virtual microphone located at a position closer to the first seat than the second microphone, and outputs the first seat voice, a second filter configured to extract and output a component of the first seat voice from an output of the first filter, a delay unit configured to delay and output the output of the first microphone, a third filter configured to extract and output a component of the first seat voice from an output of the delay unit, and an addition unit configured to add an output of the second filter and an output of the third filter to generate the speech voice of the user in the first seat to be output to the speaker, and the delay unit delays the output of the first microphone such that delay times of the component of the first seat voice output from the second filter and the component of the first seat voice output from the third filter match.

Here, for example, a transfer function of the first filter may be set in advance, by causing a third microphone that is a microphone disposed at a position of the first seat virtual microphone to collect a predetermined tuning sound while outputting the predetermined tuning sound from the speech position of the user in the first seat, causing a first adaptive filter to perform an adaptive operation with a difference between an output of the first adaptive filter having the output of the second microphone as an input and an output of the third microphone delayed by a predetermined time as an error, and setting a transfer function of the converged first adaptive filter as the transfer function of the first filter.

Further, for example, a transfer function of the second filter and a transfer function of the third filter may be set in advance, by causing a second adaptive filter to perform an adaptive operation with a difference between an output of the second adaptive filter having the output of the first filter as an input and an output of the first microphone delayed by a predetermined time as an error while outputting a predetermined tuning sound from the speech position of the user in the first seat, and setting a transfer function of the converged second adaptive filter as the transfer function of the second filter, and by causing a third adaptive filter to perform an adaptive operation with a difference between an output of the third adaptive filter having the output of the first microphone delayed by the predetermined time as an input and the output of the first filter as an error while outputting the predetermined tuning sound from the speech position of the user in the first seat, and setting a transfer function of the converged third adaptive filter as the transfer function of the third filter.

Further, the above in-vehicle communication support system may have the first microphone disposed at a position away from a center in a right-left direction of the first seat by a predetermined distance in a direction opposite to the second seat, and may have the position of the first seat virtual microphone be a position away from the center in the right-left direction of the first seat in a direction of the second seat by the predetermined distance.

Further, the in-vehicle communication support system may further include an audio device that outputs a sound of audio content toward the third seat.

According to such an in-vehicle communication support system, it is possible to increase the directivity in the speech position direction of the user in the first seat and to improve an SN ratio of the speech voice of the user in the first seat to be output from the speaker with the efficient configuration using the second microphone provided at the second seat without adding a microphone to the first seat. Further, since the transfer function of each filter of the signal processing unit is fixed, it is also possible to suppress an increase in processing load.

As described above, according to forms of the present disclosure, it is possible to improve the SN ratio of the speech voice to be output from the speaker with the relatively efficient configuration in the in-vehicle communication support system that collects the speech voice of the user with the microphone and outputs the voice from the speaker to other users.

BRIEF DESCRIPTION OF THE DRAWINGS

FIG. 2A1 is a diagram illustrating an arrangement of a speaker and a microphone of the in-vehicle communication support system according to the embodiment of the disclosure;

FIG. 2A2 is a diagram illustrating an arrangement of a speaker and a microphone of the in-vehicle communication support system according to the embodiment of the disclosure;

FIG. 2B is a diagram illustrating an arrangement of a speaker and a microphone of the in-vehicle communication support system according to the embodiment of the disclosure;

FIGS. 5A1 and 5A2 are diagrams illustrating an arrangement of a learning microphone and a learning speaker according to the embodiment of the present disclosure;

FIG. 5B1 and 5B2 are diagrams illustrating an arrangement of a learning microphone and a learning speaker according to the embodiment of the present disclosure.

DETAILED DESCRIPTION

Hereinafter, an embodiment of the disclosure will be described.

Figure 1:
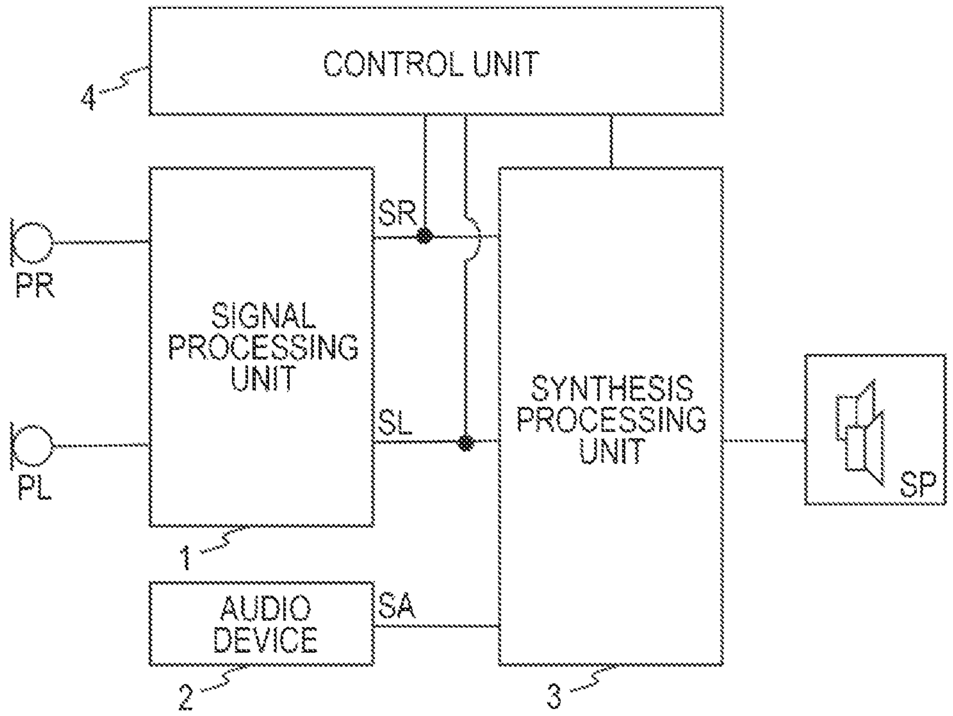
FIG. 1 is a block diagram illustrating a configuration of an in-vehicle communication support system according to an embodiment of the disclosure.
Figure 3:
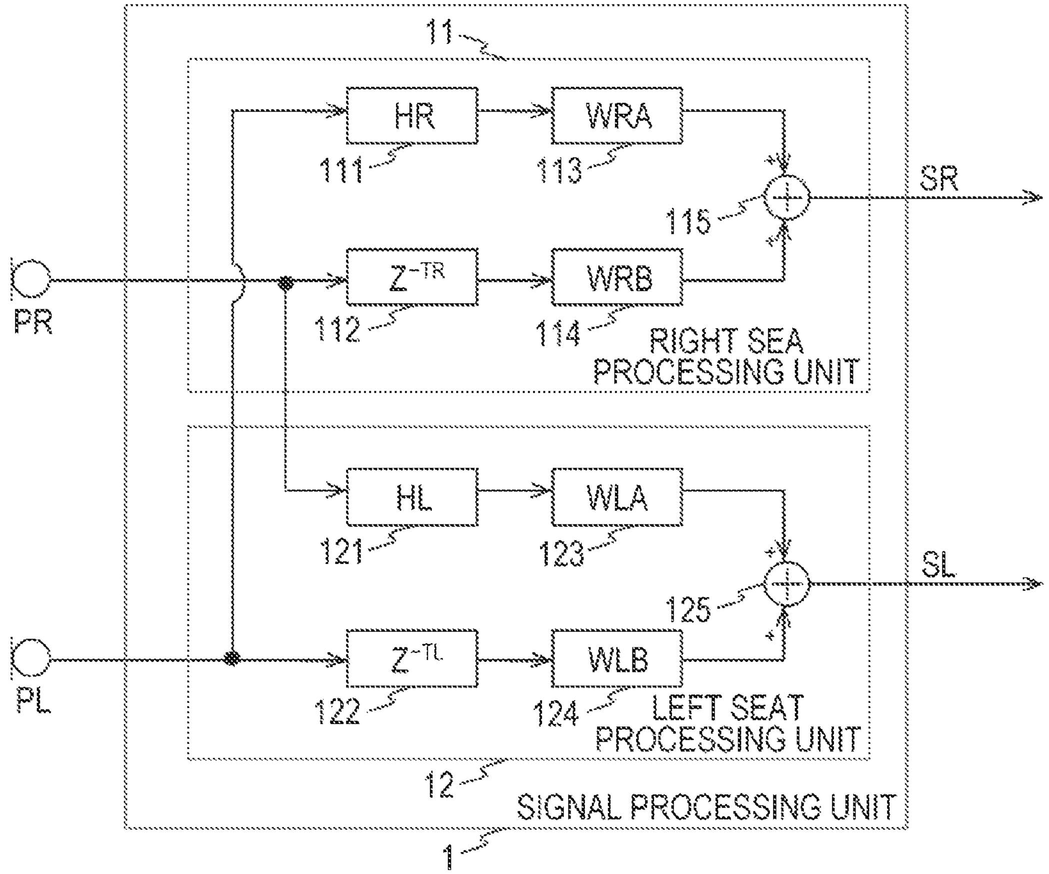
FIG. 3 is a block diagram illustrating a configuration of a signal processing unit according to the embodiment of the present disclosure.

FIG. 1 illustrates a configuration of one form an in-vehicle communication support system according to the present embodiment.

The in-vehicle communication support system is a system mounted on an automobile, and includes a right front seat microphone PR, a left front seat microphone PL, a signal processing unit 1, an audio device 2, a synthesis processing unit 3, a control unit 4, and a speaker SP, as illustrated in the drawing.

As illustrated in FIGS. 2A1 and 2A2, the right front seat microphone PR is disposed on a right side of a headrest in a right front seat of the automobile so as to collect a speech voice of a user seated in the right front seat, and the left front seat microphone PL is disposed on a left side of a headrest in a left front seat of the automobile so as to collect a speech voice of a user seated in the left front seat.

Further, the speaker SP is disposed near a rear seat so as to emit sound toward a user seated in the rear seat.

The signal processing unit 1 generates a right front seat speech voice signal SR representing the speech voice of the user in the right front seat with a higher SN ratio than the right front seat microphone PR and a left front seat speech voice signal SL representing the speech voice of the user in the left front seat with a higher SN ratio than the left front seat microphone PL from an output of the right front seat microphone PR and an output of the left front seat microphone PL, and outputs the generated signals to the synthesis processing unit 3.

The synthesis processing unit 3 synthesizes the right front seat speech voice signal SR, the left front seat speech voice signal SL, and an output sound signal SA representing music or the like output from the audio device 2 under the control of the control unit 4, and outputs a synthesized signal from the speaker SP.

The control unit 4 monitors the presence or absence of a speech of the user in the right front seat and the presence or absence of a speech of the user in the left front seat from the right front seat speech voice signal SR and the left front seat speech voice signal SL.

Then, the control unit 4 controls the synthesis processing unit 3 to synthesize the right front seat speech voice signal SR with the output sound signal SA with a predetermined gain and output the synthesized signal to the speaker SP while the user in the right front seat is speaking, and controls the synthesis processing unit 3 to mute the right front seat speech voice signal SR and not to synthesize the right front seat speech voice signal SR with the output sound signal SA when the user in the right front seat is not speaking. Then, the control unit 4 controls the synthesis processing unit 3 to synthesize the left front seat speech voice signal SL with the output sound signal SA with a predetermined gain and output the synthesized signal to the speaker SP while the user in the left front seat is speaking, and controls the synthesis processing unit 3 to mute the left front seat speech voice signal SL and not to synthesize the left front seat speech voice signal SL with the output sound signal SA when the user in the left front seat is not speaking.

Here, when the user in the right front seat or the user in the left front seat is speaking, the control unit 4 may perform control to cause the synthesis processing unit 3 to decrease the gain of the output sound signal SA.

Next, FIG, 3 illustrates the configuration of the signal processing unit 1.

As illustrated in the drawing, the signal processing unit 1 includes a right seat processing unit 11 that generates the right front seat speech voice signal SR from the output of the right front seat microphone PR and the output of the left front seat microphone PL, and a left seat processing unit 12 that generates the left front seat speech voice signal SL from the output of the left front seat microphone PL and the output of the right front seat microphone PR.

The right seat processing unit 11 includes, assuming that the voice generated at a speech position of the user in the right front seat is a right front seat voice, a filter HR 111 that converts the right front seat voice being output from the left front seat microphone PL into the right front seat voice collected by a right seat virtual microphone PVR that is a virtual microphone located on the left side of the headrest of the right front seat as illustrated in FIG. 28, a delay unit $Z^{-TR}$ 112 configured to delay and output the output from the right front seat microphone PR to match a delay time of the right front seat voice being output with a delay time of the right front seat voice being output from the filter HR 111, a filter WRA 113 that extracts the right front seat voice being output from the filter HR 111, a filter WRB 114 that extracts the right front seat voice being output from the delay unit $Z^{-TR}$ 112, and a right adder 115 that adds outputs of the filter WRA 113 and the filter WRB 114 and outputs an added output as the right front seat speech voice signal SR.

Here, by the addition of the right adder 115, the right front seat voice being output from the right front seat microphone PR and the right front seat voice collected by the right front seat virtual microphone PVR located at the position different from the right front seat microphone PR are added, and other voice components are offset. Therefore, a virtual microphone array with enhanced directivity toward a speech position direction of the user in the right front seat, using the right front seat microphone PR and the right seat virtual microphone PVR, is formed, and the right front seat speech voice signal SR with an improved SN ratio of the right front seat voice as compared with the output of the right front seat microphone PR, which is output by the virtual microphone array, is output from the speaker.

Similarly, the left seat processing unit 12 includes, assuming that the voice generated at a speech position of the user in the left front seat is a left front seat voice, a filter HL 121 that converts the left front seat voice being output from the right front seat microphone PR into the left front seat voice collected by a left seat virtual microphone PVL that is a virtual microphone located on the right side of the headrest of the left front seat as illustrated in FIG. 2B, a delay unit $Z^{-TL}$ 122 configured to delay and output the output from the left front seat microphone PL to match a delay time of the left front seat voice being output with a delay time of the left front seat voice being output from the filter HL 121, a filter WLA 123 that extracts the left front seat voice being output from the filter HL 121, a filter WLB 124 that extracts the left front seat voice being output from the delay unit $Z^{-}$TL 122, and a left adder 125 that adds outputs of the filter WLA 123 and the filter WLB 124 and outputs an added output as the left front seat speech voice signal SL.

Here, by the addition of the left adder 125, the left front seat voice being output from the left front seat microphone PL and the left front seat voice collected by the left front seat virtual microphone PVL located at the position different from the left front seat microphone PL are added, and other voice components are offset. Therefore, a virtual microphone array with enhanced directivity toward a speech position direction of the user in the left front seat, using the left front seat microphone PL and the left seat virtual microphone PVL, is formed, and the left front seat speech voice signal SL having an improved SN ratio of the left front seat voice as compared with that of the output of the left front seat microphone PL, which is output by the virtual microphone array, is output from the speaker.

Here, setting of transfer functions (filter coefficients) of the filter HR 111, the filter WRA 113, and the filter WRB 114 of the right seat processing unit 11 is performed by performing, in advance, tuning in a first stage for calculating the transfer function of the filter HR 111 and tuning in a second stage for calculating the transfer functions of the filter WRA 113 and the filter WRB 114, and setting the calculated transfer functions to the filter HR 111, the filter WRA 113, and the filter WRB 114.

Figure 4:
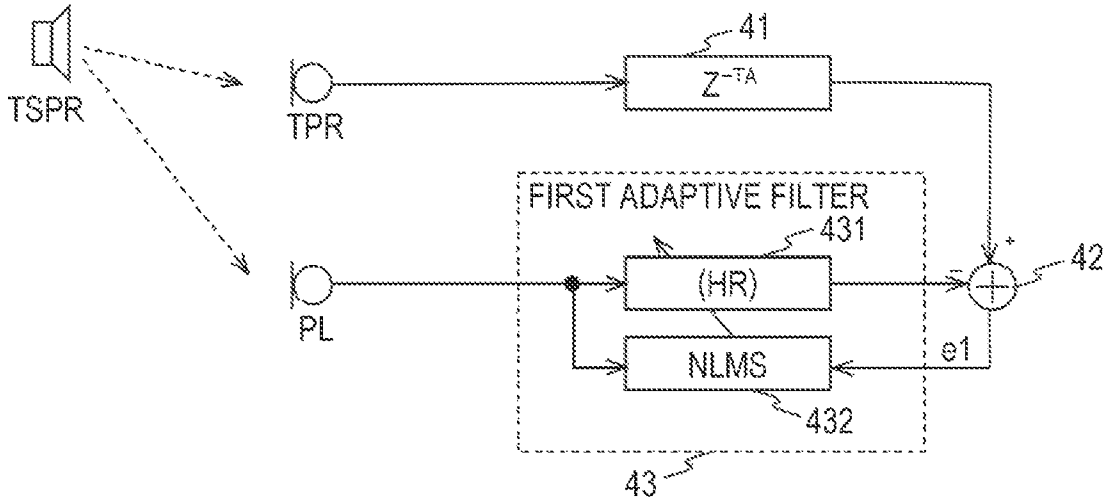
FIG. 4 is a block diagram illustrating a configuration of tuning in a first stage according to the embodiment of the present disclosure.

The tuning in the first stage is performed with the configuration illustrated in FIG. 4.

As illustrated in the drawing, this configuration includes a right front seat speaker TSPR, a right front seat learning microphone TPR, the left front seat microphone PL, a first delay unit $Z^{-TA}$ 41, a first adder 42, and a first adaptive filter 43. Further, the first adaptive filter 43 includes a first variable filter 431 and a first adaptive algorithm execution unit 432 that updates a transfer function (filter coefficient) of the first variable filter 431 by an adaptive algorithm such as NLMS.

As illustrated in FIGS. 5A1 and 5A2, the right front seat speaker TSPR is a speaker disposed at the speech position of the user in the right front seat, and the right front seat learning microphone TPR is a microphone disposed on the left side of the headrest of the right front seat, that is, at the position of the right seat virtual microphone PVR.

The tuning in the first stage is performed while predetermined tuning voice is output from the right front seat speaker TSPR.

The voice collected by the left front seat microphone PL is output to the first adder 42 through the first variable filter 431 of the first adaptive filter 43. The first delay unit $Z^{-TA}$ 41 delays and outputs the voice collected by the right front seat learning microphone TPR, and matches the delay time of the tuning voice being output with the delay time of the tuning voice being output by the left front seat microphone PL.

The first adder 42 subtracts the output of the first variable filter 431 from the output of the first delay unit $Z^{-TA}$ 41 and outputs a result as an error e1 to the first adaptive algorithm execution unit 432 of the first adaptive filter 43.

The first adaptive algorithm execution unit 432 executes the adaptive algorithm such as NLMS and updates the transfer function of the first variable filter 431 so as to minimize the error e1.

Then, it waits until the transfer function of the first variable filter 431 converges by the above operation. When the transfer function of the first variable filter 431 has converged, the transfer function becomes a function that converts the voice having the speech position of the user in the right front seat collected by the left front seat microphone PL as a sound source position into a voice having a correlation as strong as possible (as approximate as possible) with the voice having the speech position of the user in the right front seat collected by the right front seat learning microphone TPR as a sound source position, that is, a function that converts the voice having the speech position of the user in the right front seat being output from the left front seat microphone PL as the sound source position into a voice having the speech position of the user in the right front seat collected by the right seat virtual microphone PVL as the sound source position. Therefore, the converged transfer function of the variable filter is set as the transfer function of the filter HR 111.

Figure 6:
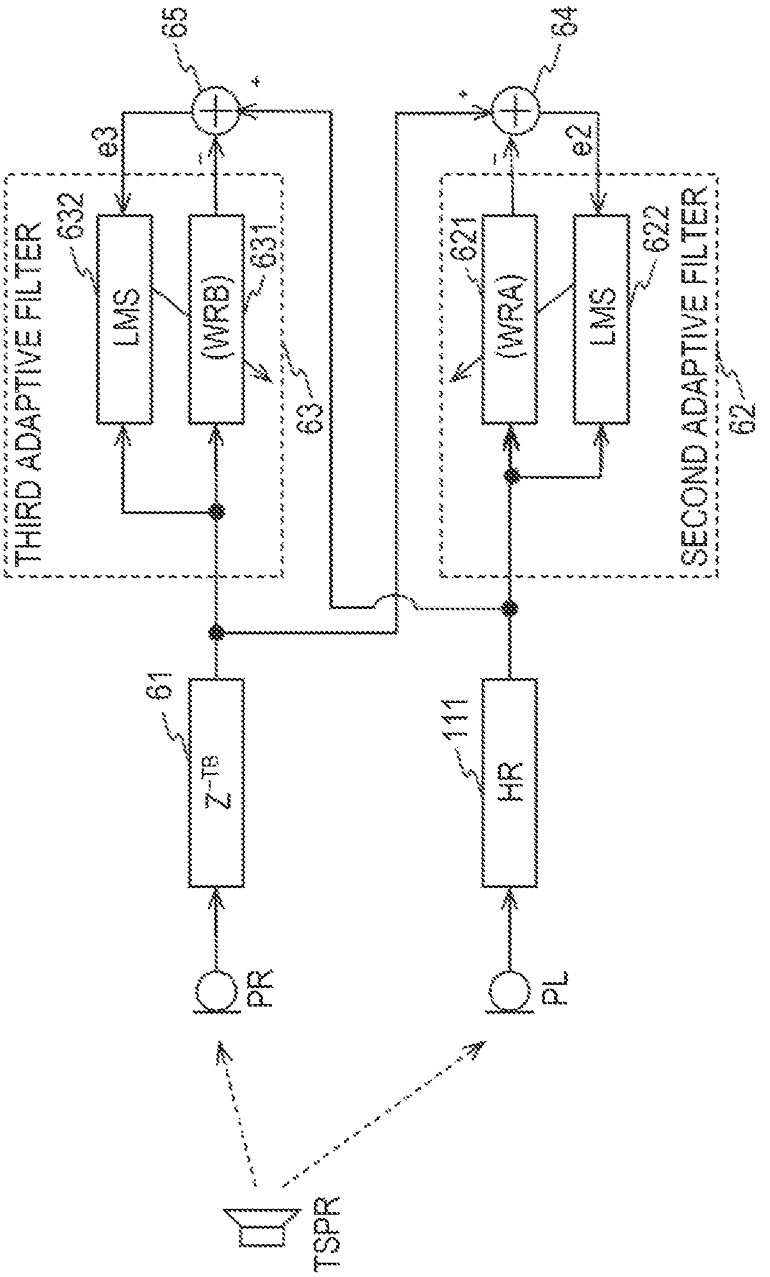
FIG. 6 is a block diagram illustrating a configuration of tuning in a second stage according to the embodiment of the present disclosure.

Next, the tuning in the first stage is performed with the configuration illustrated in FIG. 6.

As illustrated in the drawing, this configuration includes the right front seat speaker TSPR, the left front seat microphone PL, the right front seat microphone PR, the filter HR 111 for which the transfer function obtained in the tuning in the second stage is set, a second delay unit $Z^{-TB}$ 61, a second adaptive filter 62, a third adaptive filter 63, a second adder 64, and a third adder 65.

Further, the second adaptive filter 62 includes a second variable filter 621 and a second adaptive algorithm execution unit 622 that updates a transfer function (filter coefficient) of the second variable filter 621 by an adaptive algorithm such as LMS, and the third adaptive filter 63 includes a third variable filter 631 and a third adaptive algorithm execution unit 632 that updates a transfer function (filter coefficient) of the third variable filter 631 by an adaptive algorithm such as LMS.

The tuning in the second stage is performed while predetermined tuning voice is output from the right front seat speaker TSPR.

The voice collected by the left front seat microphone PL is output to the second adder 64 through the filter HR 111 and the second variable filter 621 of the second adaptive filter 62. The second delay unit $Z^{-TB}$ 61 delays and outputs the voice collected by the right front seat microphone PR, and matches the delay time of the tuning voice being output with the delay time of the tuning voice being output by the left front seat microphone PL. Then, the output of the second delay unit $Z^{-TB}$ 61 is output to the third adder 65 through the third variable filter 631 of the third adaptive filter 63.

The second adder 64 subtracts the output of the second variable filter 621 from the output of the first delay unit $Z^{-TB}$ and outputs a result as an error e2 to the second adaptive algorithm execution unit 622 of the second adaptive filter 62.

The second adaptive algorithm execution unit 622 executes the adaptive algorithm such as LMS and updates the transfer function of the second variable filter 621 so as to minimize the error e2, The third adder 65 subtracts the output of the third variable filter 631 from the output of the filter HR 111 and outputs a result as an error e3 to the third adaptive algorithm execution unit 632 of the third adaptive filter 63.

The third adaptive algorithm execution unit 632 executes the adaptive algorithm such as LMS and updates the transfer function of the third variable filter 631 so as to minimize the error e3.

Then, after the convergence of the transfer function of the second variable filter 621 and the transfer function of the third variable filter 631 by the above operation, the converged transfer function of the second variable filter 621 is set as the transfer function of the filter WRA 113, and the converged transfer function of the third variable filter 631 is set as the transfer function of the filter WRB 114.

Here, in the state where the transfer function of the second variable filter 621 and the transfer function of the third variable filter 631 converge, the transfer function of the second variable filter 621 is a function that extracts a component most correlated with the voice collected by the right front seat microphone PR from the voice collected by the right seat virtual microphone PVL, the transfer function of the third variable filter 631 is a function that extracts a component most correlated with the voice collected by the right seat virtual microphone PVL from the voice collected by the right front seat microphone PR, and the most correlated components are components of a tuning voice having the speech position of the user in the right front seat as the sound source position. Therefore, the transfer function of the second variable filter 621 is a transfer function that extracts voice having the speech position of the user in the right front seat as the sound source position from the voice collected by the right seat virtual microphone PVL and the transfer function of the third variable filter 631 is a transfer function that extracts the voice having the speech position of the user in the right front seat as the sound source position from the sound collected by the right front seat microphone PR.

Next, setting of the transfer functions (filter coefficients) of the filter HL 121, the filter WLA 123, and the filter WLB 124 in the left seat processing unit is similarly performed by performing, in advance, tuning in the first stage for calculating the transfer function of the filter HL 121 and tuning in the second stage for calculating the transfer functions of the filter WLA 123 and the filter WLB 124, and setting the calculated transfer functions to the filter HL 121, the filter WLA 123, and the filter WLB 124.

The content of the tuning in the first stage and the tuning in the second stage for calculating the transfer function of each filter of the left seat processing unit 12 is obtained by replacing "left" with "right" and replacing "R" with "L" in the description of the tuning in the first stage and the tuning in the second stage for calculating the transfer function of each filter of the above-described right seat processing unit 11. Therefore, as illustrated in FIGS. 5B1 and 5B2, a left front seat speaker TSPL used in the calculation of the transfer functions of the filter HL 121, the filter WLA 123, and the filter WLB 124 of the left seat processing unit 12 is a speaker disposed at the speech position of the user in the left front seat, and a left front seat learning microphone TPL is a microphone disposed on the right side of the headrest of the left front seat, that is, at the position of the left seat virtual microphone PVL.

One embodiment of the present disclosure has been described above.

As described above, it is possible to increase the directivity in the speech position direction of the user at the seat and to improve the SN ratio of the speech voice of the user at the seat output from the speaker with the efficient configuration using the microphone provided at another seat in addition to the microphone at the seat. Further, since the transfer function of each filter of the signal processing unit 1 is fixed, it is also possible to suppress an increase in processing load.

Note that the above in-vehicle communication support system may be provided with another signal processing unit using an adaptive filter such as an echo canceller that cancels a component of a speech voice output to a speaker, the speech voice having been collected by the right front seat microphone PR or the left front seat microphone PL. Even in this case, since the transfer function of each filter of the signal processing unit 1 is fixed, the operation of the other signal processing units does not interfere with the adaptive filter.

Although embodiments and implementations of the present disclosure have been described in detail above, the present disclosure is not limited to the specific embodiments, and various modifications and changes can be made within the scope of the gist of the disclosure set forth in the claims. Therefore, it is intended that this disclosure not be limited to the particular embodiments disclosed, but that the disclosure will include all embodiments falling within the scope of the appended claims.

What is claimed is:

1. An in-vehicle communication support system mounted on an automobile having a first seat and a second seat that are seats arranged right and left and a third seat that is a seat arranged, in a front-rear direction, with the first seat and the second seat, the in-vehicle communication support system comprising:

a first microphone disposed near the first seat;

a second microphone disposed near the second seat;

a speaker configured to output sound toward the third seat; and a signal processing unit configured to generate a speech voice of a user in the first seat and a speech voice of a user in the second seat to be output to the speaker using an output of the first microphone and an output of the second microphone;

wherein a voice having a sound source position at a speech position of the user in the first seat is a first seat voice;

wherein the signal processing unit comprises:

a first filter configured to convert the first seat voice collected by the second microphone into the first seat voice collected by a first seat virtual microphone located at a position closer to the first seat than the second microphone, and outputs the first seat voice, a second filter configured to extract and output a component of the first seat voice from an output of the first filter, a delay unit configured to delay and output the output of the first microphone, a third filter configured to extract and output a component of the first seat voice from an output of the delay unit, and an addition unit configured to add an output of the second filter and an output of the third filter to generate the speech voice of the user in the first seat to be output to the speaker; and wherein the delay unit is configured to delay the output of the first microphone such that delay times of the component of the first seat voice output from the second filter and the component of the first seat voice output from the third filter match.

2. The in-vehicle communication support system according to claim 1, wherein:

a transfer function of the first filter is set in advance, by causing a third microphone that is a microphone disposed at a position of the first seat virtual microphone to collect a predetermined tuning sound while outputting the predetermined tuning sound from the speech position of the user in the first seat, causing a first adaptive filter to perform an adaptive operation with a difference between an output of the first adaptive filter having the output of the second microphone as an input and an output of the third microphone delayed by a predetermined time as an error, and setting a transfer function of the converged first adaptive filter as the transfer function of the first filter.

3. The in-vehicle communication support system according to claim 2, wherein:

a transfer function of the second filter and a transfer function of the third filter are set in advance, by causing a second adaptive filter to perform an adaptive operation with a difference between an output of the second adaptive filter having the output of the first filter as an input and an output of the first microphone delayed by a predetermined time as an error while outputting a predetermined tuning sound from the speech position of the user in the first seat, and setting a transfer function of the converged second adaptive filter as the transfer function of the second filter, and by causing a third adaptive filter to perform an adaptive operation with a difference between an output of the third adaptive filter having the output of the first microphone delayed by the predetermined time as an input and the output of the first filter as an error while outputting the predetermined tuning sound from the speech position of the user in the first seat, and setting a transfer function of the converged third adaptive filter as the transfer function of the third filter.

4. The in-vehicle communication support system according to claim 3, wherein:

the first microphone is disposed at a position away from a center in a right-left direction of the first seat by a predetermined distance in a direction opposite to the second seat, and the position of the first seat virtual microphone is a position away from the center in the right-left direction of the first seat in a direction of the second seat by the predetermined distance.

5. The in-vehicle communication support system according to claim 4, further comprising:

an audio device that outputs a sound of audio content toward the third seat.

6. The in-vehicle communication support system according to claim 1, wherein:

a transfer function of the second filter and a transfer function of the third filter are set in advance, by causing a second adaptive filter to perform an adaptive operation with a difference between an output of the second adaptive filter having the output of the first filter as an input and an output of the first microphone delayed by a predetermined time as an error while outputting a predetermined tuning sound from the speech position of the user in the first seat, and setting a transfer function of the converged second adaptive filter as the transfer function of the second filter, and by causing a third adaptive filter to perform an adaptive operation with a difference between an output of the third adaptive filter having the output of the first microphone delayed by the predetermined time as an input and the output of the first filter as an error while outputting the predetermined tuning sound from the speech position of the user in the first seat, and setting a transfer function of the converged third adaptive filter as the transfer function of the third filter.

7. The in-vehicle communication support system according to claim 6, wherein:

the first microphone is disposed at a position away from a center in a right-left direction of the first seat by a predetermined distance in a direction opposite to the second seat, and the position of the first seat virtual microphone is a position away from the center in the right-left direction of the first seat in a direction of the second seat by the predetermined distance.

8. The in-vehicle communication support system according to claim 7, further comprising:

an audio device configured to output a sound of audio content toward the third seat.

* * * * *